(12) United States Patent
Hedlund et al.

(10) Patent No.: US 11,510,389 B2
(45) Date of Patent: Nov. 29, 2022

(54) ANTI-TWIST LINER AND SHELL FOR A DAIRY ANIMAL TEAT CUP ASSEMBLY

(71) Applicant: GEA Farm Technologies, Inc., Naperville, IL (US)

(72) Inventors: Nathan Hedlund, Lewiston, MN (US); Terry Thornton, Galesville, WI (US)

(73) Assignee: Gea Farm Technologies, Inc., Naperville, IL (US)

( * ) Notice: Subject to any disclaimer, the term of this patent is extended or adjusted under 35 U.S.C. 154(b) by 21 days.

(21) Appl. No.: 17/014,053

(22) Filed: Sep. 8, 2020

(65) Prior Publication Data
US 2020/0396954 A1 Dec. 24, 2020

Related U.S. Application Data
(62) Division of application No. 14/039,998, filed on Sep. 27, 2013, now abandoned.

(51) Int. Cl.
*A01J 5/08* (2006.01)
*A01J 5/06* (2006.01)

(52) U.S. Cl.
CPC .. *A01J 5/06* (2013.01); *A01J 5/08* (2013.01)

(58) Field of Classification Search
CPC ..................................... A01J 5/06; A01J 5/08
USPC ...................... 119/14.47, 14.48, 14.49, 14.51
See application file for complete search history.

(56) References Cited

U.S. PATENT DOCUMENTS

| | | | |
|---|---|---|---|
| 1,020,258 A | 3/1912 | Bundy | |
| 3,096,740 A | 7/1963 | Noorlander | |
| 4,269,143 A | 5/1981 | Erbach | |
| 4,604,969 A | 8/1986 | Larson | |
| 4,913,471 A | 4/1990 | Huneke | |
| 5,069,162 A | 12/1991 | Thompson | |
| 5,572,947 A | 11/1996 | Larson et al. | |
| 6,055,931 A | 5/2000 | Sanford, Jr. et al. | |
| 6,058,879 A * | 5/2000 | Miefalk | F16L 37/0985 119/14.47 |
| 6,435,132 B1 | 8/2002 | Milbrath et al. | |
| 6,640,744 B2 | 11/2003 | Lincke | |
| 6,899,055 B2 | 5/2005 | Alveby et al. | |
| 6,997,136 B1 * | 2/2006 | Coates | A01J 5/08 119/14.47 |
| D552,306 S | 10/2007 | Shin | |
| 7,290,498 B2 | 11/2007 | Shin | |

(Continued)

FOREIGN PATENT DOCUMENTS

| | | | |
|---|---|---|---|
| EP | 1352557 A1 * | 10/2003 | ................ A01J 5/08 |
| EP | 3048875 B1 | 7/2018 | |

(Continued)

OTHER PUBLICATIONS

ANSI/ASABE Standard AD3918:2007 "Milking Machine Installations—Vocabulary" Jan. 2011, St. Jospeh, Michigan, USA, 11 pages.

(Continued)

*Primary Examiner* — Monica L Perry
(74) *Attorney, Agent, or Firm* — BainwoodHuang

(57) ABSTRACT

A milker unit teat cup assembly for dairy animals having a shell and liner combination that resists twisting by the liner barrel relative to the shell using a recess in the liner that is spaced apart from the longitudinal axis in the liner and engaged by a key in the shell.

12 Claims, 7 Drawing Sheets

(56) References Cited

U.S. PATENT DOCUMENTS

| | | | |
|---|---|---|---|
| 7,293,527 | B2 | 11/2007 | Shin |
| 7,452,433 | B2 | 11/2008 | Shin et al. |
| 7,578,260 | B2 | 8/2009 | Shin |
| 7,650,854 | B2 | 1/2010 | Petterson et al. |
| 7,975,647 | B2 | 7/2011 | Saho et al. |
| 8,056,505 | B2 | 11/2011 | Laney et al. |
| 8,113,145 | B2 | 2/2012 | Sellner |
| 8,176,873 | B2 | 5/2012 | Shin |
| 8,302,561 | B2 | 11/2012 | Laney et al. |
| 8,356,576 | B2 | 1/2013 | Laney et al. |
| 8,464,656 | B2 | 6/2013 | Schulze Wartenhorst et al. |
| 8,627,785 | B2 | 1/2014 | Grace et al. |
| 9,258,976 | B2 | 2/2016 | Alveby et al. |
| 9,635,829 | B2 | 5/2017 | La Torre et al. |
| 2005/0155209 | A1* | 7/2005 | Isendam ............ F16L 37/025 29/446 |
| 2008/0035064 | A1* | 2/2008 | Petterson ............ A01J 5/08 119/14.47 |
| 2009/0184512 | A1 | 7/2009 | Giorgetti |
| 2009/0235868 | A1* | 9/2009 | Kassibrahim ......... A01J 5/08 119/14.47 |
| 2010/0194104 | A1 | 8/2010 | Hennemann |
| 2012/0042830 | A1 | 2/2012 | Shin |
| 2012/0325155 | A1 | 12/2012 | Shin |
| 2014/0123903 | A1* | 5/2014 | Priest ............... A01J 5/08 119/14.47 |
| 2015/0090183 | A1 | 4/2015 | Hedlund et al. |

FOREIGN PATENT DOCUMENTS

| | | |
|---|---|---|
| GB | 2119620 A | 11/1983 |
| RU | 2672495 C2 | 11/2018 |
| WO | 01/145497 | 6/2001 |
| WO | WO-2008143583 A1 * | 11/2008 ............ A01J 5/044 |
| WO | 2011/068609 A2 | 6/2011 |

OTHER PUBLICATIONS

International Search Report and Written Opinion dated Nov. 19, 2014 for PCT/US2014/05681.

Extended European Search Report for EP Application No. 18185175.9, dated Mar. 6, 2019, 8 pages.

New Zealand Examination Report for NZ Application No. 717977 dated Feb. 17, 2020, 3 pages.

New Zealand Examination Report for NZ Application No. 756661 dated Feb. 18, 2020, 3 pages.

New Zealand Examination Report for NZ Application No. 756661 dated May 15, 2020, 2 pages.

Mew Zealand Examination Report for NZ Application No. 756664 dated Feb. 18, 2020, 3 pages.

Mew Zealand Examination Report for NZ Application No. 756664 dated May 15, 2020, 3 pages.

* cited by examiner

ANTI-TWIST LINER AND SHELL FOR A DAIRY ANIMAL TEAT CUP ASSEMBLY

CROSS REFERENCE TO RELATED APPLICATION

This application is a divisional of U.S. application Ser. No. 14/039,998, filed Sep. 27, 2013, the disclosure of which is incorporated by reference herein.

FIELD AND BACKGROUND OF THE INVENTION

This invention relates generally to milker units for milking dairy animals, and more particularly to a milker unit shell and liner combination that resists twisting of the liner relative to the shell.

Milker units for milking dairy animals include a shell and liner in a teat cup assembly that attaches to a dairy animal teat. The liner fits inside the shell and a vacuum chamber is defined between the shell and the liner. A pulsating vacuum is applied to the vacuum chamber to move the liner in and out of compression (massaging) contact with a dairy animal teat that is in the liner. The pulsating vacuum in the pulsation chamber is opposed by a constant vacuum inside of the liner. The pulsating vacuum is applied through a pulsation connection in the side of the shell and the constant vacuum is applied through a milk hose connected to the liner. The milk hose vacuum also draws milk from the liner into a short milk tube, milking claw, and collection bowl, through a long milk tube, and into a milk collection system.

The shell and liner are fitted together in a coaxial relationship and a mouthpiece of the liner fits over the top of the shell so that the mouthpiece, and not the shell, contacts the animal. The mouthpiece provides a vacuum seal against the teat and udder of the animal being milked. The liner also includes a barrel joined to the mouthpiece and into which the animal's teat extends during milking. The teat is massaged by the liner barrel by the pulsating vacuum. Various barrel designs have been developed to improve cow comfort and milking efficiency.

A lower end of the liner barrel extends out of a hole in the lower end of the shell. The liner barrel typically includes a locking ring that is pulled through the shell hole during assembly, so that the locking ring is outside of the shell when the liner is installed.

The liner is adequately secured in the shell because the upper mouthpiece of the liner is engaged with an upper end of the shell, and the locking ring of the liner is engaged with a lower end of the shell. In a typical shell and liner assembly, the liner will even be somewhat tensioned in an axial direction because of the opposing engagements at the top and bottom of the shell.

Extending downstream from the liner is a short milk tube that can be joined to or formed with the liner. For a variety of reasons, the short milk tube can be twisted and that twisting can cause the liner barrel to twist as well. The twisting of the short milk tube can be intentional to close the vacuum line when a dairy operator decides to leave a teat cup assembly off a dairy animal because there is no teat or the teat is injured or otherwise too unhealthy to be milked. Other forces can twist the short milk tube, so it is not uncommon for liner barrel to be twisted as well. When the liner barrel twists, it is possible that the seal with the dairy animal can fail or it can otherwise inhibit efficient milking and milking operations.

Previous liners have been designed that include ribs or flanges that are fitted into slots during insertion of the liner into the shell. Some of these designs are used to control collapse of the liner barrel into a predetermined shape, but they can also help prevent twisting. Typically, these designs are relatively expensive to manufacture and time-consuming to install. Since liners are replaced periodically, the added cost for such designs is cumulative and relatively expensive.

Thus, there is needed a relatively inexpensive shell and liner assembly that reduces twisting of the liner inside the shell while maintaining good sealing contact with the animal being milked and efficiency of the milking process.

SUMMARY OF THE INVENTION

To provide a cost-effective anti-twist shell liner, there is provided in accordance with the present invention a milker unit shell liner having: a mouthpiece defining a teat opening; a barrel joined to the mouthpiece, and defining a bore and a longitudinal axis aligned with the teat opening; and the barrel defines an alignment recess radially spaced apart from the longitudinal axis of the barrel. Preferably, the barrel includes, a lower locking ring joined to a lower portion of the barrel and extending radially outwardly from the barrel; and an upper locking ring joined to the lower portion of the barrel, extending radially outwardly from the barrel, and spaced apart from the lower locking ring to define a shell-engaging annular recess, and the upper locking ring defines the alignment recess. The alignment recess can open radially outwardly and be open to the annular recess.

The barrel can further define a second alignment recess spaced apart from the first alignment recess, to form a first pair of alignment recesses; and a second pair of alignment recesses spaced apart from the first pair of alignment recesses. The second pair of alignment recesses can be spaced diametrically opposite from the first pair of alignment recesses.

The milker unit shell liner can include a short milk tube joined to the barrel and define a milk bore substantially aligned with the barrel bore. The short milk tube can also define an air vent.

Also in accordance with the present invention, there is provided a milker unit teat cup assembly, having a liner that includes: a mouthpiece defining a teat opening; a barrel joined to the mouthpiece, and defining a longitudinal axis aligned with the teat opening; and a lower locking ring joined to a lower portion of the barrel and extending radially outwardly from the barrel. The barrel can include an upper locking ring joined to the lower portion of the barrel, extending radially outwardly from the barrel, and spaced apart from the lower locking ring to define a shell-engaging annular recess, and the barrel, particularly the upper locking ring, defines an alignment recess spaced radially outwardly from the longitudinal axis of the barrel; and a shell into which the shell liner is disposed, and the shell defines a lower opening with an inward annular edge disposed in the annular recess between the lower locking ring and the upper locking ring in the shell liner, and a key disposed in the alignment recess. As in the embodiment described above, the alignment recess can open radially outwardly and be open to the annular recess.

The barrel, and preferably the upper locking ring can further define a second alignment recess spaced apart from the first alignment recess to form a first pair of alignment recesses; and a second pair of alignment recesses can be spaced apart from the first pair of alignment recesses. The second pair of alignment recesses can be spaced diametrically opposite from the first pair of alignment recesses.

DETAILED DESCRIPTION OF THE DRAWINGS

Figure 1:
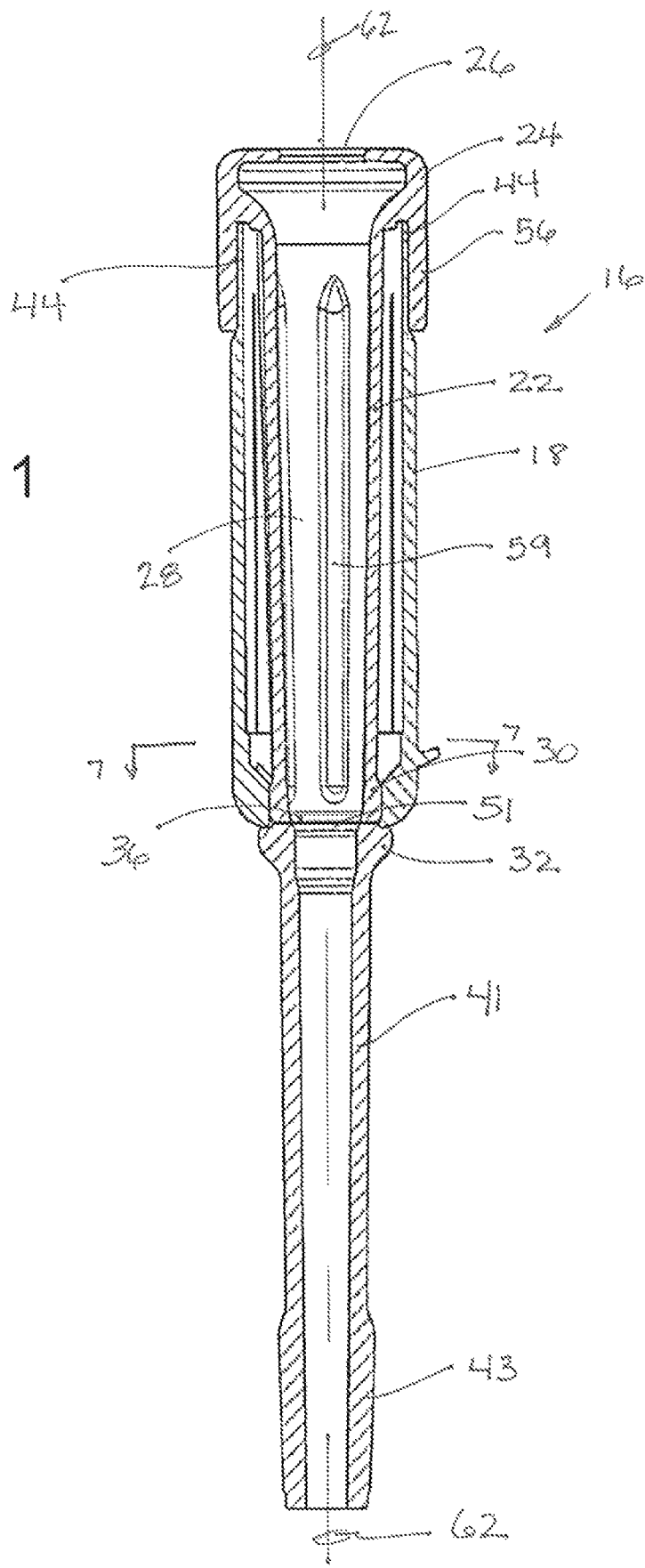
FIG. 1 is a side cross-sectional view of a teat cup assembly in accordance with the present invention.

In the following detailed description of the drawings the same reference numeral will be used to identify the same or similar elements in each of the figures. Depicted in FIG. 1 is a cross-sectional view of a teat cup assembly 16, in accordance with the present invention, including a shell 18 and a shell liner 22. The shell liner 22 includes a mouthpiece 24 defining a teat opening 26, a barrel 28 joined to the mouthpiece 24 and extending downwardly as depicted, an upper locking ring 30, and a lower locking ring 32 spaced apart from the upper locking ring to define a shell-engaging annular recess 36. The upper locking ring 30 defines a number of alignment recesses 40.

The liner 22 can also include an integral short milk tube 41 joined to the barrel 28 and having a teat claw connecting end 43. The short milk tube 41 is an optional extension of the liner 22, and in other embodiments, the short milk tube 41 can be a separate item that connects to a lower end of the liner 22.

Figure 3:
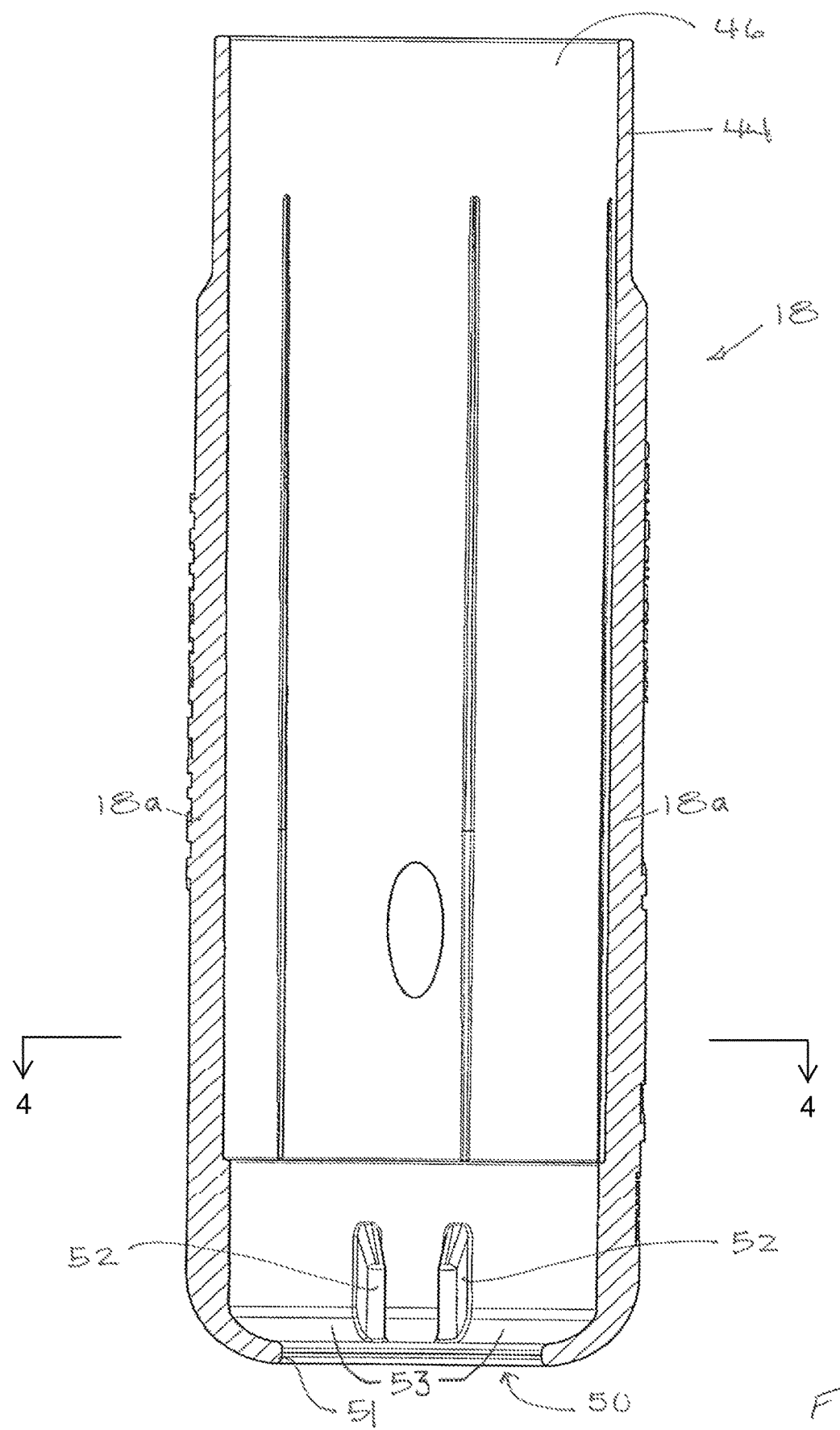
FIG. 3 is a cross-sectional perspective view of a teat cup assembly shell in accordance with the present invention.
Figure 4:
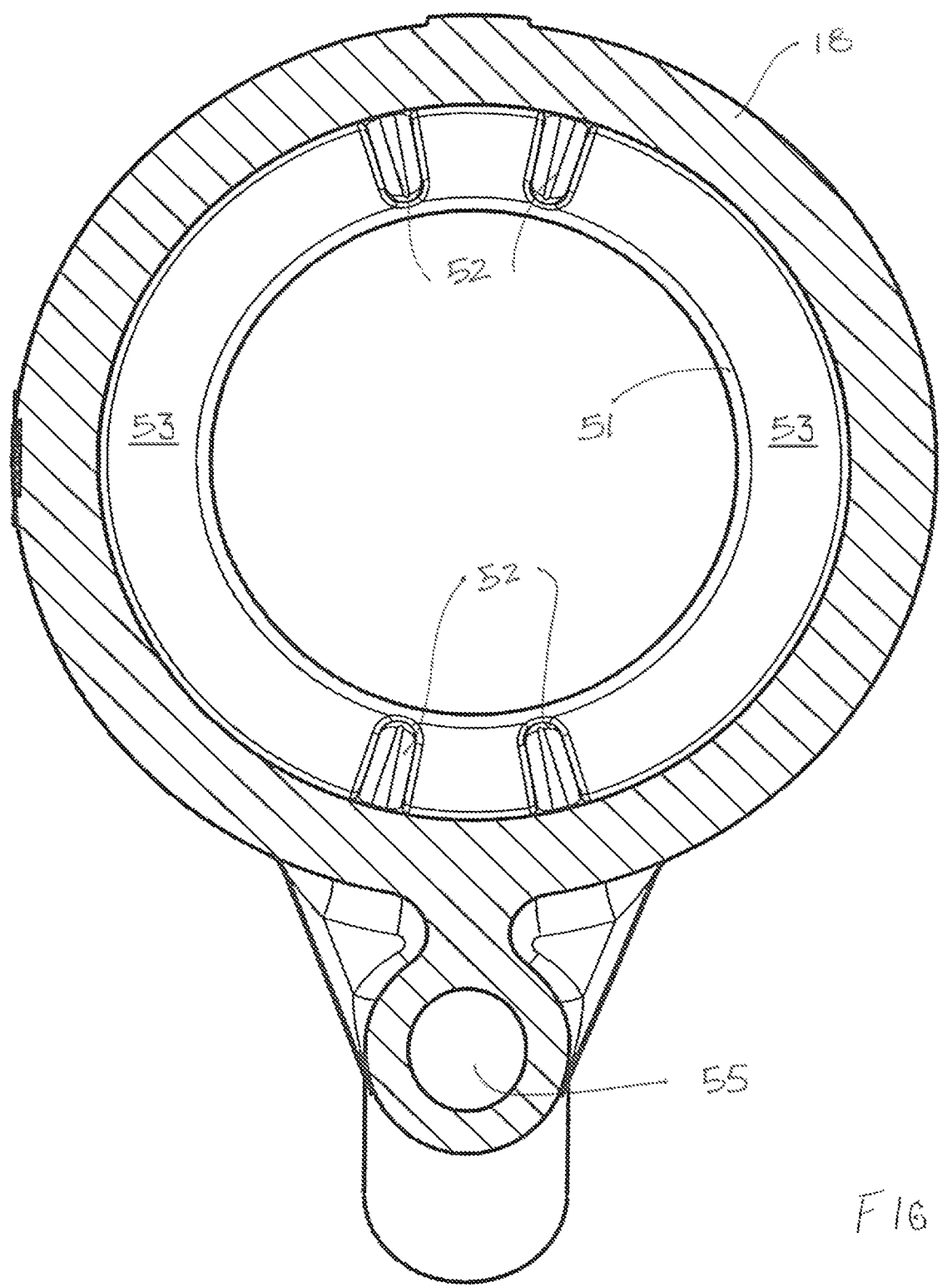
FIG. 4 is a cross-sectional view of the shell taken along line 4-4 of FIG. 3.

As illustrated in FIGS. 1, 3, and 4 the shell 18 includes an upper end 44, an upper opening 46, a lower end 48 defining a lower opening 50 with an inwardly directed annular edge 51, and keys 52 that are provided in a number, size, and arrangement to mate with the alignment recesses 40. The shell 18 also includes a pulsation connector 55. In the example shown, keys 52 extend upwardly from a bottom wall 53 of the shell 18 and extend inwardly from a cylindrical wall 18a of the shell 18.

Figure 2:
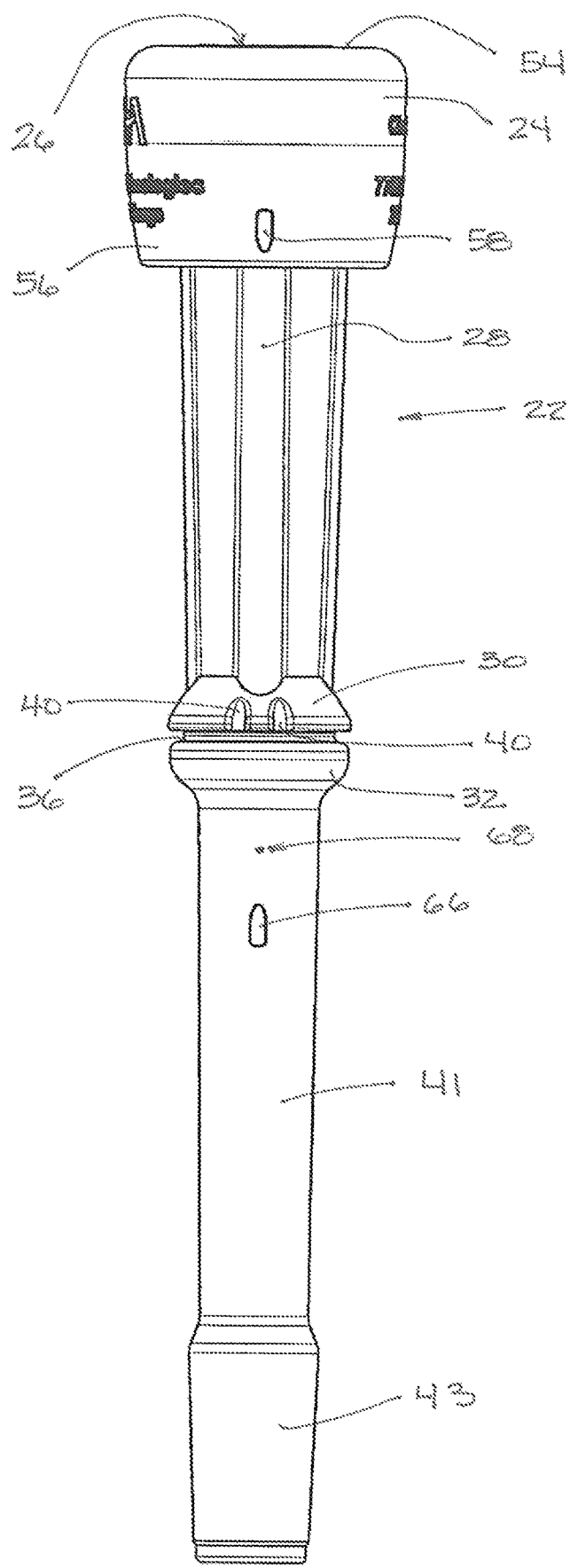
FIG. 2 is a perspective view of a teat cup assembly shell liner in accordance with the present invention.

As depicted in FIGS. 1, 2, 5, and 6, the liner 22 mouthpiece 24 can be of a type and shape described and depicted in U.S. Pat. No. 8,113,145, which is incorporated herein by reference, but other mouthpiece shapes and sizes can be used with the present invention. As depicted in FIGS. 1 and 2, the mouthpiece 24 generally includes and upper surface 54 that interfaces with a teat and udder of a dairy animal to form a comfortable seal that minimizes loss of vacuum from the inside of the liner through the teat opening 26. The mouthpiece 24 further includes a downwardly extending skirt 56 that extends downward and is spaced apart from the barrel 28 so that an upper end of the shell (described below) can fit between the barrel 28 and the mouthpiece skirt 56, when assembled. The mouthpiece skirt 56 can include an alignment mark 58 to aid in assembly.

Figure 5:
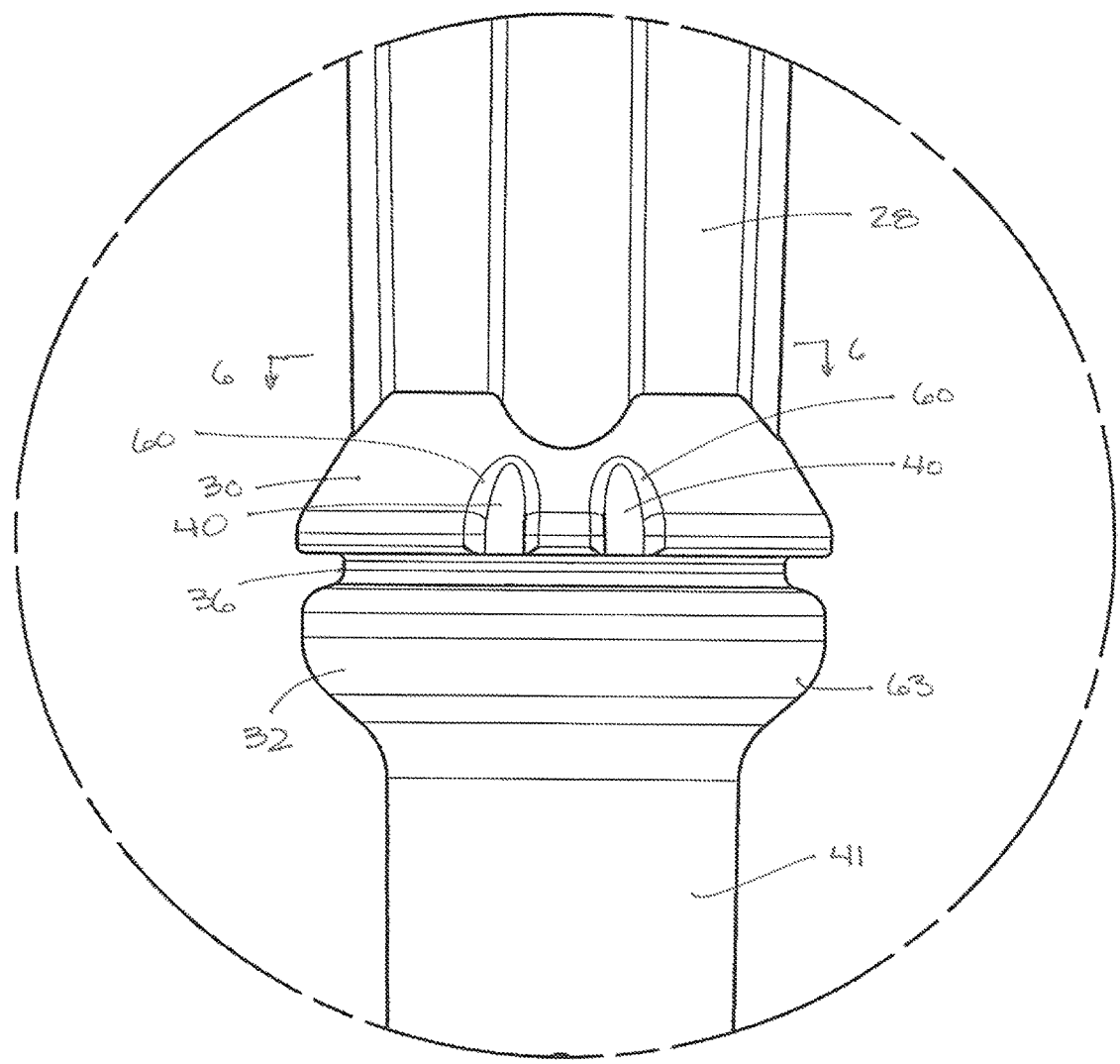
FIG. 5 is a detailed side view of the liner of FIG. 2 and illustrating a pair of alignment recesses in accordance with the present invention.
Figure 6:
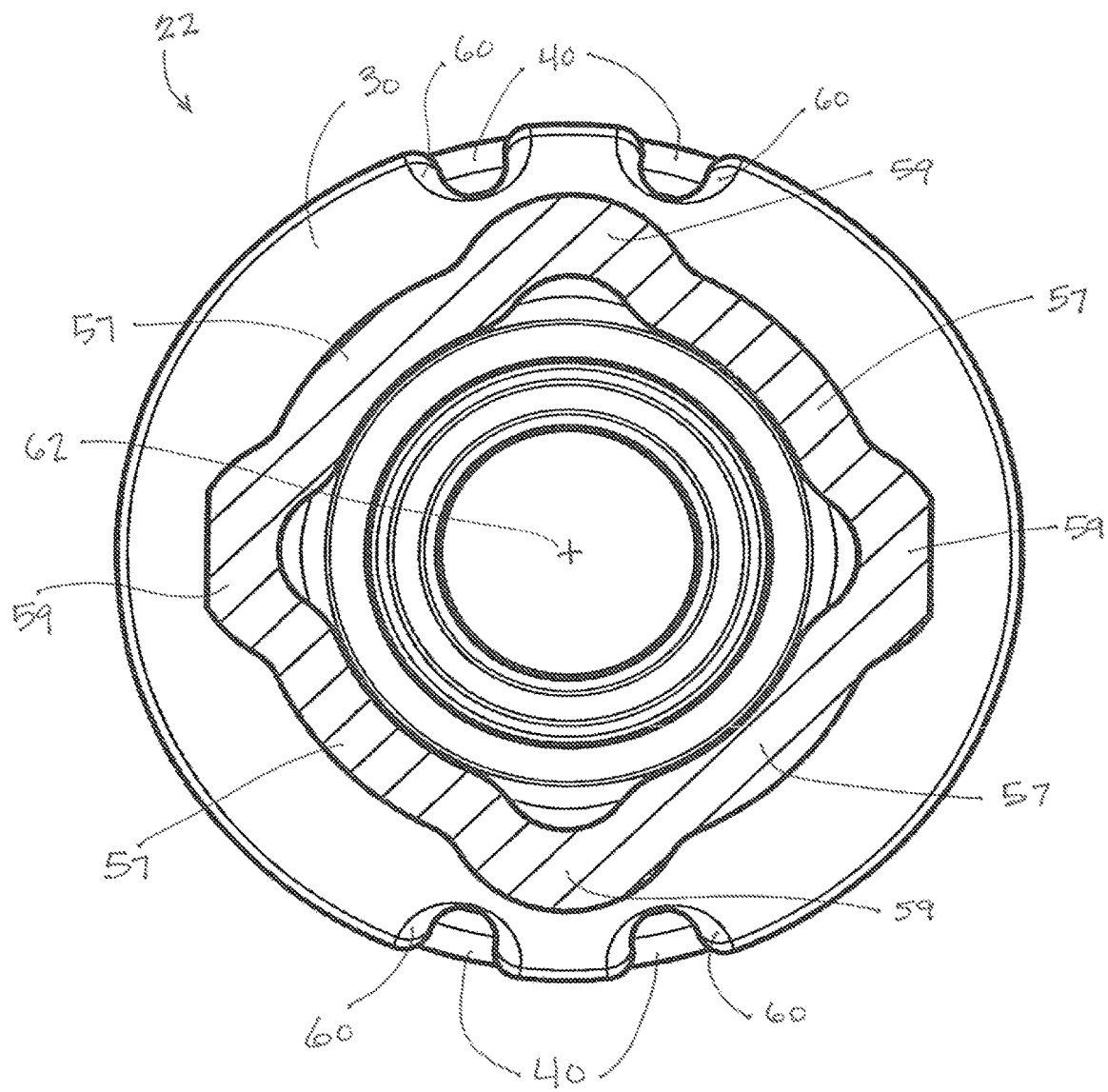
FIG. 6 is a cross-sectional view of the liner taken along line 6-6 in FIG. 5.
Figure 7:
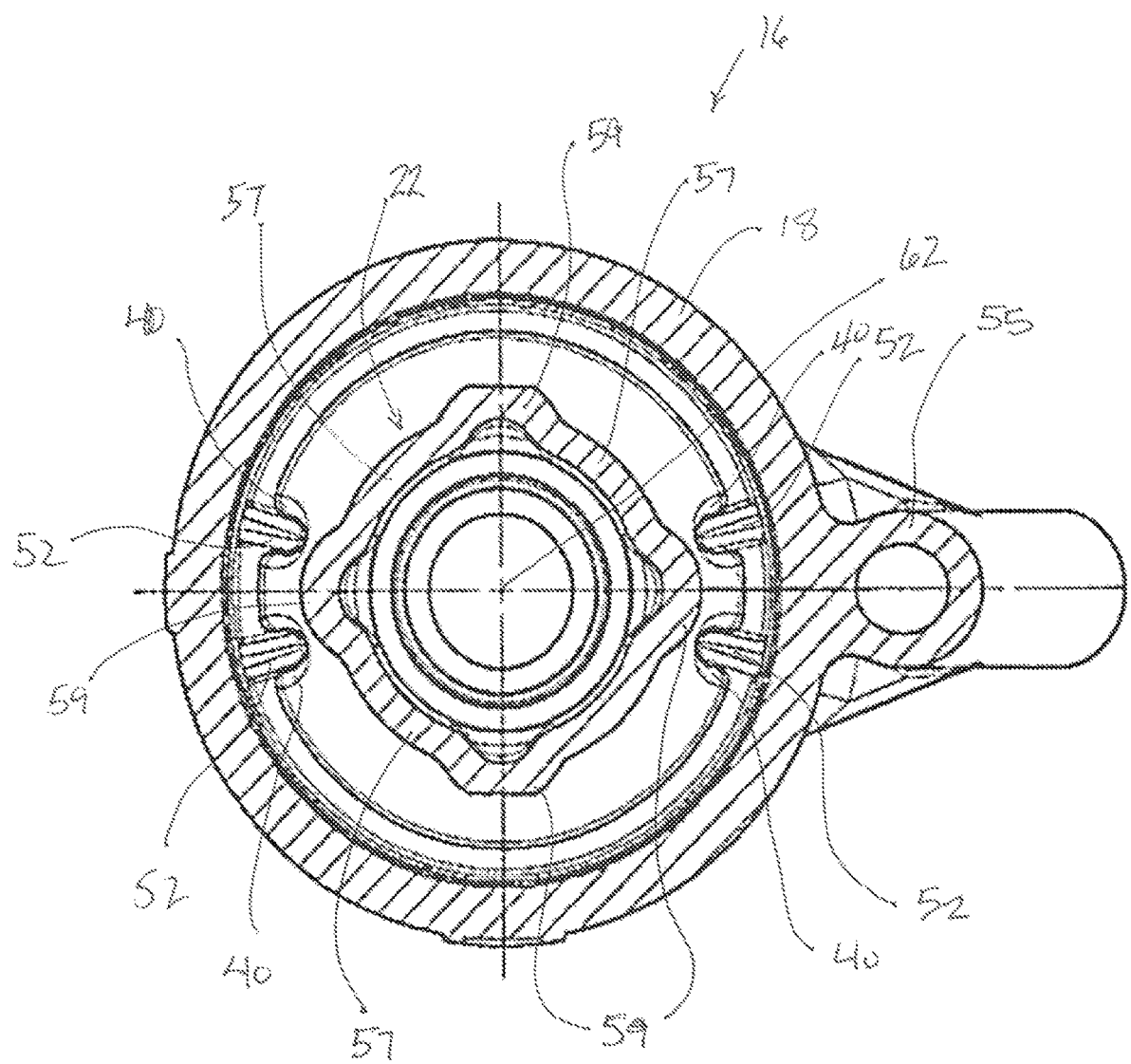
FIG. 7 is a cross-sectional view of the teat cup assembly taken along line 7-7 is FIG. 1.

The barrel 28 defines a longitudinal axis 62 (FIGS. 1, 6, and 7) and the barrel 28, itself, can have any desired cross-sectional shape including, round, oval, triangular, square, and the shape illustrated in FIGS. 1, 2, and 5, for example. Typically, barrel 28 shape is selected to optimize animal comfort and milking efficiency. The barrel 28 illustrated herein has walls 57 and corners 59 (see FIG. 5, for example) that can be of uniform thickness or have varied thicknesses to control collapse of the barrel wall during pulsation and milking or for simplifying manufacturing. Any desired barrel cross-sectional shape can be used with the present invention.

The upper locking ring 30 (sometimes referred to as a "hackle" in the dairy industry) is part of the barrel 28, and is preferably used in the present invention together with the lower locking ring 32 to define the annular recess 36. The liner 22 is joined to the shell lower opening 50 at the inwardly directed annular edge 51 using the annular recess 36. (See FIGS. 1 and 7.) This arrangement provides a secure connection between the liner 22 and shell 18, and due to friction, inhibits some level of twisting of the barrel 28 and the liner 22 relative to the shell 18. Nonetheless, twisting can still occur, so the barrel 28, and particularly the upper locking ring 30 of the liner 22, preferably defines two pairs of alignment recesses 40 to be engaged by the mating keys 52, in the shell 18. Although it is preferred to include the upper locking ring 30, it is not necessary, and the alignment recesses 40 can be formed in any part of the barrel 28, but preferably in the lower end of the barrel 28.

In the illustrated embodiment of FIG. 5, for example, the alignment recesses 40 are formed integrally or are cut or otherwise formed in the upper locking ring 30. As best seen in FIG. 5, the upper locking ring 30 defines the alignment recesses 40 as a generally inverted U-shape with rounded shoulders 60 to enable a smoother assembly of the shell keys 52 into the alignment recesses 40. Also, for forming efficiency and to provide access for the keys 52 to enter the alignment recesses 40, it is preferred that the alignment recesses 40 open to the annular recess 36, as illustrated. To prevent twisting of the liner 22 relative to the shell 18, the alignment recess 40 should be radially spaced apart from a longitudinal axis of the barrel 28.

The drawings illustrate the alignment recesses 40 in two pairs with one pair on a diametrically opposed side from the other. Although the illustrated arrangement is preferred, other arrangements of alignment recesses 40 are possible. For example, a single alignment recess 40 can be used on an asymmetrical arrangement, particularly if a particular orientation of the liner 22 relative to the shell 18 is desired.

Similarly, the shell keys 52 can be provided to match the number of alignment recesses 40, or relatively fewer keys 52 can be provided. For example, two alignment recesses 40 and one key 52 can be used to make it easier to assemble the liner 22 into the shell 18.

The lower locking ring 32 preferably includes a rounded surface 63 against which the inwardly directed annular edge 51 of the lower end of the shell 18 will slide when the liner 22 is being installed in the shell 18. Once the liner 22 is installed, the inwardly directed annular edge 51 is releasably engaged with the liner's annular recess 36. Also, once the liner 22 is installed, it is preferably tensioned somewhat along the longitudinal axis 62, due to the relative size of the shell 18 and the liner 22. This is sometimes referred to as "pretensioning" and it improves liner performance.

The short milk tube 41 can define an alignment feature 66 raised above, which is seen as a vertical embossment on the short milk tube 41 in FIG. 2. An air vent 68 can also be provided and its location relative to other milker unit components can be controlled using the present invention, if desired.

Preferably, the liner is made of silicone, but any other suitable liner material can be used.

The foregoing detailed description of the drawings is provided for a better understanding of the present invention. Nothing therein is intended to unduly limit the scope of the following claims and no unnecessary limitations should be read into the following claims.

The invention claimed is:

1. A method for installing an anti-twist shell liner into a shell of a teat cup assembly, and the teat cup assembly includes:
 a shell having an upper opening, a bottom wall including an annular edge defining a bottom opening, a cylindrical wall portion between the upper opening and the bottom wall, and a plurality of spaced apart mating keys joined to and extending upwardly from the bottom wall and extending radially inwardly from the cylindrical wall portion;
 a shell liner having:
  a mouthpiece;
  a cylindrical barrel portion joined to the mouthpiece, and spaced apart from and not connected to the cylindrical wall portion;
  an upper locking ring joined to the cylindrical barrel portion, and the upper locking ring defines a plurality of spaced apart alignment recesses each disposed to engage a corresponding mating key of the plurality of spaced-apart making keys, and each of the alignment recesses does not extend into the cylindrical barrel portion;
  a lower locking ring spaced apart from the upper locking ring to define an annular recess; and
  an integral short milk tube joined integrally to the lower locking ring;
 and the method comprises the steps of:
  partially installing the shell liner in the shell by:
   extending the integral short milk tube through the shell and partially out of the bottom opening; and
   partially engaging each mating key of the plurality of mating keys into a corresponding recess of the plurality of spaced apart alignment recesses; and
  fully installing the shell liner in the shell by extending the integral short milk tube completely through the shell and out of the bottom opening and moving the shell liner only in an axial direction to fully engage each mating key of the plurality of mating keys with its corresponding alignment recess of the plurality of spaced apart alignment recesses and engaging the annular edge of the shell with the annular recess.

2. The method of claim 1, and wherein the step of partially installing the shell liner in the shell further comprises the step of:
 maintaining the annular edge of the shell away from the annular recess of the shell liner.

3. The method of claim 1, and wherein the step of fully installing the shell liner in the shell further comprises the step of:
 fitting the mouthpiece to the shell upper opening.

4. The method of claim 1, and wherein the step of fully installing the shell liner in the shell further comprises the step of:
 pretensioning the shell liner along a longitudinal axis of the shell liner.

5. The method of claim 1, and wherein the step of partially installing the shell liner in the shell further comprises the step of:
 aligning an alignment feature on the shell liner with a related feature on the shell.

6. The method of claim 1, wherein each of the plurality of spaced-apart alignment recesses has a respective opening to the annular recess, and wherein partially engaging each mating key of the plurality of mating keys into a corresponding recess of the plurality of spaced apart alignment recesses includes each mating key of the plurality of mating keys entering the corresponding recess of the plurality of spaced apart alignment recesses via the respective opening to the annular recess.

7. A method for installing a shell liner into a shell of a teat cup assembly to resist twisting of the shell liner relative to the shell, the method comprising the steps of:
 partially installing a shell liner into a shell, the shell liner having a mouthpiece, a cylindrical barrel portion joined to the mouthpiece and without any shell-engaging features, an upper locking ring joined to the cylindrical barrel portion, and a lower locking ring spaced apart from the upper locking ring to define an annular recess, and an integral short milk tube joined to the lower locking ring, the step of partially installing the shell liner into the shell performed by moving the shell liner into the shell and engaging an alignment recess formed only in the upper locking ring with a corresponding mating key extending upwardly from a bottom wall of the shell and radially inwardly from a cylindrical wall of the shell; and then fully installing the shell liner into the shell to continue engaging the alignment recess with the mating key; and then
 engaging the annular recess with an annular lip in the bottom wall of the shell;
 engaging the mouthpiece with an upper opening in the shell; and
 moving the short milk tube completely through a bottom shell opening.

8. The method of claim 7, wherein the step of partially installing the shell liner into the shell further comprises the step of:
 engaging a second alignment recess formed only in the upper locking ring with a corresponding second mating key extending upwardly from the bottom wall of the shell.

9. The method of claim 7, wherein the step of partially installing the shell liner into the shell comprises the step of:
 extending the short milk tube through the bottom shell opening without engaging the annular recess with the annular lip in the bottom wall of the shell.

10. The method of claim 7, wherein the step of fully installing the shell liner into the shell further comprises the step of:
 pretensioning the shell liner in the shell.

11. The method of claim 7, wherein the step of fully installing the shell liner into the shell after the step of partially installing the shell liner in the shell comprises the step of moving the shell liner in a direction that is only parallel to a longitudinal axis of the shell.

12. The method of claim 7, wherein the alignment recess has an opening to the annular recess, wherein the corresponding mating key is disposed at a corner formed between the bottom wall of the shell and the cylindrical wall of the shell, and wherein partially installing the shell liner into the shell includes guiding the alignment recess into the corresponding mating key via the opening to the annular recess.

\* \* \* \* \*